US006952397B2

United States Patent
Mor et al.

(10) Patent No.: US 6,952,397 B2
(45) Date of Patent: Oct. 4, 2005

(54) COMMUNICATION IN A BIDIRECTIONAL RING NETWORK WITH SINGLE-DIRECTION RECEIVING

(75) Inventors: Gal Mor, Rishon-Lezion (IL); Leon Bruckman, Petach Tikva (IL); David Zelig, Givataim (IL)

(73) Assignee: Corrigent Systems Ltd., Tel Aviv (IL)

( * ) Notice: Subject to any disclaimer, the term of this patent is extended or adjusted under 35 U.S.C. 154(b) by 876 days.

(21) Appl. No.: 09/876,414

(22) Filed: Jun. 7, 2001

(65) Prior Publication Data

US 2002/0186667 A1 Dec. 12, 2002

(51) Int. Cl.[7] .................................................. H04J 3/14
(52) U.S. Cl. ...................................... 370/223; 370/258
(58) Field of Search ................................. 370/223, 221, 370/222, 224, 452, 453, 238, 227; 398/59; 714/4

(56) References Cited

U.S. PATENT DOCUMENTS

| | | | |
|---|---|---|---|
| 5,461,611 A | | 10/1995 | Drake et al. |
| 5,581,703 A | | 12/1996 | Baugher et al. |
| 5,745,476 A | * | 4/1998 | Chaudhuri .................. 370/222 |
| 6,256,292 B1 | * | 7/2001 | Ellis et al. ................... 370/227 |
| 6,314,110 B1 | | 11/2001 | Chin et al. |
| 6,339,488 B1 | | 1/2002 | Beshai et al. |
| 6,442,134 B1 | * | 8/2002 | Mitchell ...................... 370/223 |
| 6,456,407 B1 | * | 9/2002 | Tammela et al. ............. 398/59 |
| 6,606,297 B1 | * | 8/2003 | Magill et al. ............... 370/216 |
| 6,639,893 B1 | | 10/2003 | Chikenji et al. |
| 6,639,896 B1 | | 10/2003 | Goode et al. |
| 6,657,952 B1 | * | 12/2003 | Shiragaki et al. ............ 370/223 |
| 6,680,912 B1 | * | 1/2004 | Kalman et al. .............. 370/238 |
| 6,711,125 B1 | * | 3/2004 | Walrand et al. ............. 370/223 |
| 6,731,597 B1 | * | 5/2004 | Batchellor et al. .......... 370/223 |
| 6,795,394 B1 | * | 9/2004 | Swinkels et al. ............ 370/222 |
| 6,820,210 B1 | * | 11/2004 | Daruwalla et al. ............. 714/4 |

OTHER PUBLICATIONS

*IP Over Resilient Packet Rings*, Prasad Jogalekar et al., Internet Draft, draft–jogalekar–iporpr–00, Nov. 2000.

*A Framework for IP Over Packet Transport Rings*, Albert Harrera et al., Internet Draft, draft–ietf–ipoptr–framework–00, Dec. 2000.

*The Cisco SRP MAC Layer Protocol*, D. Tsiang et al., Request for Comments (RFC) 2892 of the Internet Engineering Task Force (IETF), Aug. 2000.

* cited by examiner

*Primary Examiner*—Hassan Kizou
*Assistant Examiner*—Albert T. Chou
(74) *Attorney, Agent, or Firm*—Weingarten, Schurgin, Gagnebin & Lebovici LLP

(57) ABSTRACT

A communication network includes a communication medium and a plurality of communication nodes, mutually coupled by the communication medium so as to form a ring, over which each of the nodes is configured to transmit traffic to the other nodes in both clockwise and counterclockwise directions around the ring. At least one of the nodes is configured to receive the traffic in only one of the directions at any given time.

19 Claims, 4 Drawing Sheets

COMMUNICATION IN A BIDIRECTIONAL RING NETWORK WITH SINGLE-DIRECTION RECEIVING

FIELD OF THE INVENTION

The present invention relates generally to communication networks, and specifically to high-speed packet rings.

BACKGROUND OF THE INVENTION

Network ring topologies are gaining in popularity, particularly in Internet Protocol (IP) networks. Such networks enable carriers to offer large bandwidth to users in a cost-effective manner. They also lend themselves to fast rerouting in the event of network failures, since two alternative routes—clockwise and counterclockwise—are generally available for connecting any two nodes on the ring. A drawback of traditional ring implementations, such as SONET/SDH, is that ordinarily half of the available bandwidth in these rings must be reserved for fault protection and is not exploited under normal operating conditions. Some recently-developed protocols, however, provide more efficient bandwidth utilization by enabling data to be transferred between any pair of nodes in either direction around the ring, while maintaining fast protection against faults.

By way of illustration, FIG. 1 is a block diagram that schematically shows a bidirectional packet ring network 20, as is known in the art. Network 20 comprises a plurality of nodes 22, labeled N1 through N5, which are mutually connected by a bidirectional communication medium, such as optical fibers or conductive wires. The nodes typically comprise switching equipment, and may serve as either gateways to other networks (aggregation points) or access points. The communication medium is configured to define an inner ring 26, over which packets are conveyed between the nodes in a clockwise direction, and an outer ring 28, over which the packets are conveyed in a counterclockwise direction. It will be understood that the terms "inner" and "outer," as well as "clockwise" and "counterclockwise," are used arbitrarily in the context of the present patent application and in the claims, to distinguish between the two opposing directions of packet flow in a ring network. These terms are chosen solely for convenience of explanation, and do not necessarily bear any relation to the physical characteristics of the network.

In a SONET/SDH network, one of rings 26 and 28 is designated as the active ring, while the other ring remains on standby for fault protection when needed. Thus, at any given time, all of nodes 22 transmit and receive data only on the active ring. Communication interfaces in the nodes need not be capable of handling traffic at a rate any higher than the maximum data rate of one of the rings.

Bidirectional protocols, on the other hand, allow nodes 22 to communicate with one another over either ring 26 or 28. An example of such a protocol is the Resilient Packet Rings (RPR) protocol, which is in the process of being defined as IEEE standard 802.17. Network-layer routing over RPR is described, for example, by Jogalekar et al., in "IP over Resilient Packet Rings" (Internet Draft draft-jogalekar-iporpr-00), and by Herrera et al., in "A Framework for IP over Packet Transport Rings" (Internet Draft draft-ietf-ipoptr-framework-00). A proposed solution for Media Access Control (MAC—protocol layer 2) in bidirectional ring networks is the Spatial Reuse Protocol (SRP), which is described by Tsiang et al., in Request for Comments (RFC) 2892 of the Internet Engineering Task Force (IETF). These documents, which are available at www.ietf.org, are incorporated herein by reference. Using protocols such as these, each node in network 20 can communicate directly with all other nodes through either ring 26 or 28, using the appropriate MAC addresses of the nodes. RPR and SRP allow nodes to choose whether to route their packets on the inner or the outer ring, but do not provide any method for nodes to use in deciding which ring to choose.

SRP also defines a mechanism to be used by nodes on the ring in learning the ring topology. In the topology discovery phase of network start-up, described in section 4.6 of RFC 2892, each node can send out topology packets on one or both rings. The packet hops around the ring from node to node. Each node appends to the packet its own MAC address binding and other information. Eventually the packet comes back to the originating node, which uses the information that has been appended by the other nodes to build a topology map of the ring.

FIGS. 2A and 2B are block diagrams that schematically illustrate details of nodes 22 that are used in network 20, based on the RPR protocol described above. Node 22 comprises a RPR block 30, connected to transmit and receive data over both of rings 26 and 28. Block 30 is responsible for ring management and performs the MAC-layer functions of capturing packets that are addressed to node 22 on either ring, while passing all other traffic through to the next node along the ring. Node 22 typically has one MAC address on ring 26 and another on ring 28, to which packets may be sent by the other nodes. Alternatively, a single MAC address may be used for both rings.

When RPR block 30 captures a packet addressed to node 22, it delivers the packet to a traffic processing block 32 or 34 of the node. This block is typically implemented as a network processor chip that is able to access higher-layer protocol headers at wire speed (to avoid bottlenecks). It is responsible for network-layer functions, such as IP processing, and optionally other higher-level functions, as well, such as Quality of Service (QoS) and network security. In a node that serves as an access point, for example, block 32 or 34 is typically responsible for delivery of packets to users who are connected to network 20 through the node.

Normally, most of the packets arriving at RPR block 30 on rings 26 and 28 are passed through to the next node, so that the data rate required of traffic processing blocks 32 and 34 is considerably less than the maximum data rate of the network. The maximum data rate on each of the rings is identified in FIGS. 2A and 2B as "X". It may occur at certain times, however, that a given node 22 will receive traffic at the full rate X on one or both of the rings. To deal with this situation, node 22 must have a traffic processing capacity of rate 2X. This capacity is achieved in FIG. 2A by providing two traffic processing blocks 32, each with an operating rate of X. RPR block 30 passes incoming packets on ring 26 to the traffic processing block shown on the right side in the figure, and incoming packets on ring 28 to the traffic processing block on the left side. An interface between the two traffic processing blocks can be used when interconnection is required. Alternatively, in the implementation shown in FIG. 2B, a single traffic processing block 34 with two rate X interfaces is used.

The dual, high-rate interfaces and traffic processing circuitry required in nodes 22, as shown in FIGS. 2A and 2B, contribute substantially to the cost, complication and power consumption of the nodes. These costs become ever more significant as the speed of network 20 increases. Furthermore, most of this high-speed capacity is wasted most of the time, since normally a given node consumes only a small portion of the total ring bandwidth.

SUMMARY OF THE INVENTION

It is an object of some aspects of the present invention to provide improved communication methods and devices for use in bidirectional ring networks.

It is a further object of some aspects of the present invention to reduce the levels of hardware complication and cost of nodes in a bidirectional ring network.

In preferred embodiments of the present invention, a communication network comprises a plurality of nodes arranged in a ring topology. The nodes are capable of transmitting data around the network at any time in both clockwise and counterclockwise directions. At least some of the nodes, however, are configured to receive data in only one selected direction at any given time. Therefore, these nodes require only a single high-speed interface for processing incoming traffic, as in unidirectional rings such as SONET/SDH networks. As noted above, nodes that are known in the art for use in bidirectional rings, such as RPR networks, require two of these costly and complex interfaces.

Typically, the number of nodes in the ring network that are configured to receive data on the clockwise ring is roughly equal to the number configured to receive data on the counterclockwise ring. To send data to a particular receiving node, the transmitting node determines whether the receiving node is configured to "listen" for traffic on the clockwise or the clockwise ring, and then sends the data on the appropriate ring. As a result, the full bidirectional bandwidth of the network can be exploited, in contrast to SONET/SDH rings in which half this bandwidth is unused.

In some preferred embodiments of the present invention, the nodes are dynamically configurable during operation of the network. Preferably, during a start-up phase, each of the nodes learns the network topology, chooses the ring (clockwise or counterclockwise) on which it will receive data, and announces its choice to the other nodes. Most preferably, each node selects the ring that gives the shortest path to a particular gateway node in the network. While the network is operating, a node may choose to switch its receiving direction, typically due to changes in the network (addition or removal of a node, for example) or a fault that causes traffic on one of the rings to be wrapped or steered onto the other ring. Upon switching its receiver, the node announces the change to the other nodes using a predetermined protocol. The other nodes update their own MAC tables and alter their transmit direction accordingly.

There is therefore provided, in accordance with a preferred embodiment of the present invention, a communication network, including:

a communication medium; and a plurality of communication nodes, mutually coupled by the communication medium so as to form a ring, over which each of the nodes is configured to transmit traffic to the other nodes in both clockwise and counterclockwise directions around the ring, while at least one of the nodes is configured to receive the traffic in only one of the directions at any given time.

Preferably, when the plurality of the nodes includes a gateway node, the at least one of the nodes is configured to receive the traffic in the direction in which the at least one of the nodes is reached from the gateway nodes in a minimal number of hops. Further preferably, the gateway node is configured to receive the traffic in both the clockwise and counterclockwise directions. Typically, the at least one of the nodes includes a network access node.

Alternatively or additionally, the at least one of the nodes includes multiple nodes, each configured to receive the traffic only in a respective one of the directions, and the respective direction is selected for each of the multiple nodes so as to balance the traffic carried in the clockwise and counterclockwise directions around the ring.

Preferably, the nodes are adapted to maintain information indicative of the respective directions in which the other nodes are configured to receive the traffic, and to select the directions in which to transmit the traffic to the other nodes responsive to the information. Most preferably, the nodes are adapted to send topology discovery packets around the ring to the other nodes in both the clockwise and the counterclockwise directions, and to extract the information from the packets after the packets have made a complete circuit of the ring.

Further preferably, the at least one of the nodes is adapted to reconfigure the direction in which it is to receive the traffic while the network is in operation, and to send the remaining nodes in the network a notification when it reconfigures the direction, so that the remaining nodes update accordingly the information that they maintain. In a preferred embodiment, upon receiving the notification, the remaining nodes delay transmitting the traffic to the at least one of the nodes for a predetermined waiting period.

There is also provided, in accordance with a preferred embodiment of the present invention, a communication device, for operation as a node in a ring network over which traffic is transmitted in both clockwise and counterclockwise directions, the device including:

a traffic processing block, adapted to prepare outgoing data packets for transmission over the network and to process incoming data packets received from the network; and a media access control block, interfacing to the traffic processing block and adapted to be coupled to the network so as to transmit the outgoing data packets over the network in both of the clockwise and counterclockwise directions, while passing to the traffic processing block the incoming data packets that it receives in only one of the clockwise and counterclockwise directions.

Preferably, when the network is configured to carry the traffic at a predetermined maximum data rate in each of the clockwise and counterclockwise directions, the media access control block and traffic processing blocks are interfaced to one another at a data rate not substantially greater than the predetermined maximum.

Further preferably, the media access control block is configurable to enable selection, while the network is in operation, of the one of the clockwise and counterclockwise directions in which the incoming data packets are to be received and passed to the traffic processing block. Additionally or alternatively, the media access control block is adapted to maintain information indicating in which of the directions other nodes in the network are configured to receive the traffic, and to select the directions in which to transmit the outgoing data packets to the other nodes responsive to the information.

There is additionally provided, in accordance with a preferred embodiment of the present invention, a method for communication, including:

coupling a plurality of communication nodes together in a ring, so as to enable each of the nodes to transmit traffic simultaneously in both clockwise and counterclockwise directions; and configuring at least one of the nodes to receive the traffic in only one of the directions at any given time.

The present invention will be more fully understood from the following detailed description of the preferred embodiments thereof, taken together with the drawings in which:

DETAILED DESCRIPTION OF PREFERRED EMBODIMENTS

Figure 1:
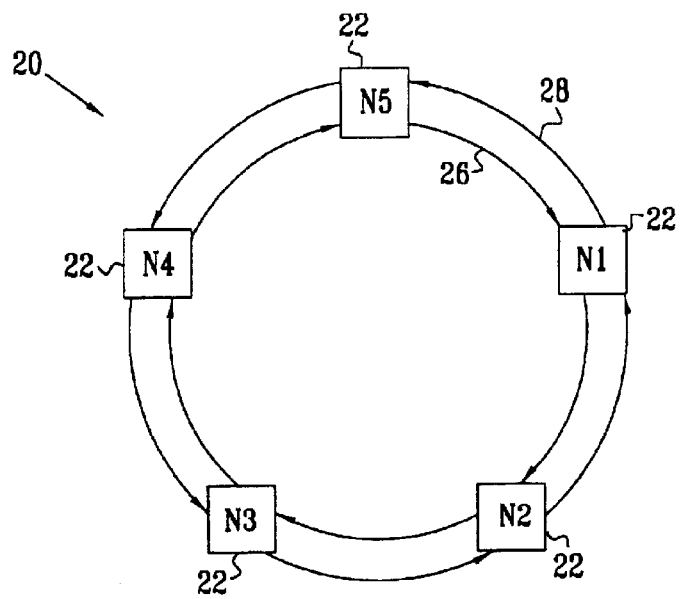
FIG. 1 is a block diagram that schematically illustrates a ring network, as is known in the art.
Figure 2A:
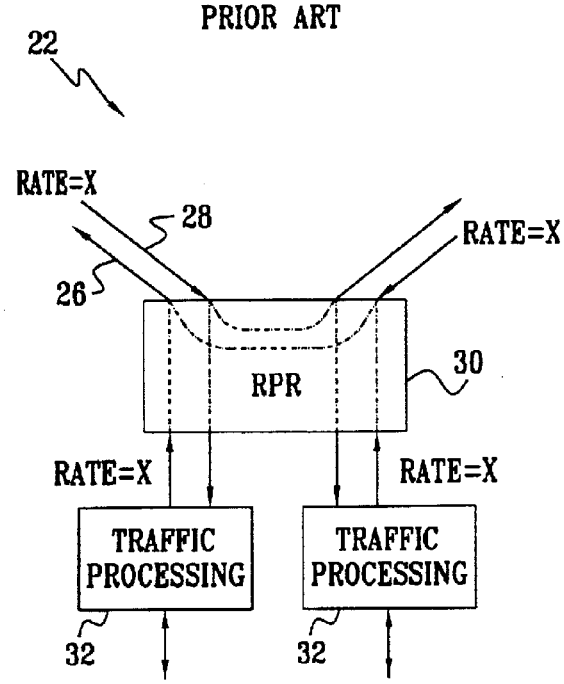
FIGS. 2A and 2B are block diagrams that schematically illustrate nodes in the network of FIG. 1.
Figure 2B:
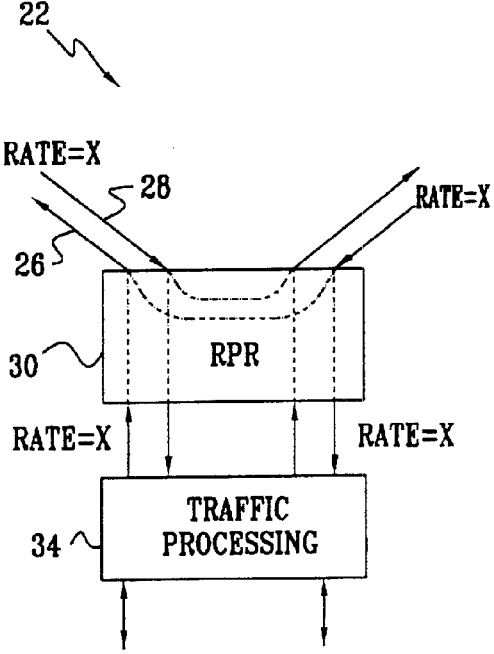
Figure 3:
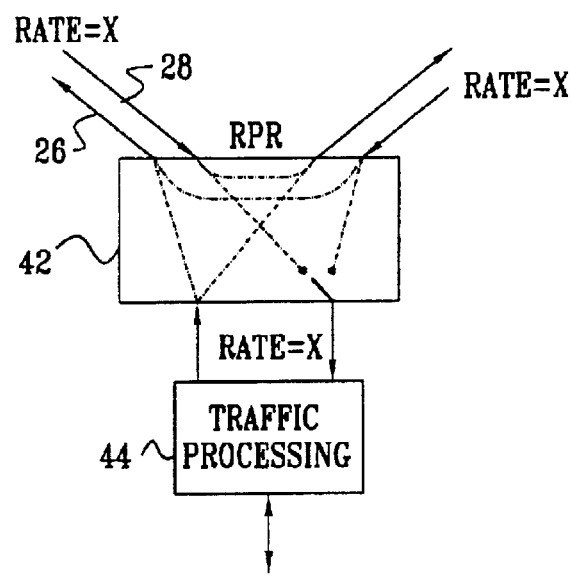
FIG. 3 is a block diagram that schematically illustrates a node in a ring network, in accordance with a preferred embodiment of the present invention.

FIG. 3 is a block diagram that schematically illustrates a node 40 for use in a bidirectional ring network, in accordance with a preferred embodiment of the present invention. Node 40 comprises a RPR block 42 and a traffic processing block 44. With the exception of the differences described hereinbelow, blocks 42 and 44 are respectively similar to blocks 30 and 32, as described in the Background of the Invention. RPR block 42 is configured to enable node 40 to transmit traffic over both clockwise ring 26 and counter-clockwise ring 28, in accordance with the above-mentioned RPR protocol, but to receive traffic only on one of the rings at any given time. Therefore, traffic processing block 44 contains only a single interface with rate X, rather than two such interfaces as in nodes 22 of network 20 (FIGS. 2A and 2B). Preferably, node 40 selects the ring to which RPR block 42 is to listen for incoming traffic at start-up of network operation. The node can alter its choice of ring subsequently, as described hereinbelow.

Figure 4:
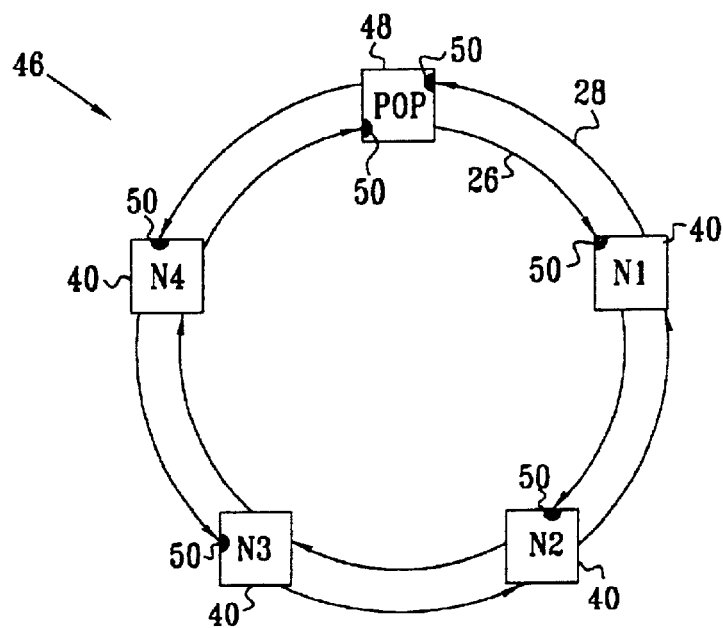
FIG. 4 is a block diagram that schematically illustrates a ring network, in accordance with a preferred embodiment of the present invention.

FIG. 4 is a block diagram that schematically illustrates a ring network 46 that is populated with nodes 40, in accordance with a preferred embodiment of the present invention. Nodes 40 are marked N1 through N4, and the network also includes a gateway node, identified as Point of Presence (POP) node 48, which typically provides accesses to other networks, not shown in the figure. Each of nodes 40 has one designated receive port 50 on the ring to which that node has chosen to listen for incoming traffic. On the other hand, since most of the traffic in network 46 typically passes to and from POP node 48, the POP node preferably has receive ports 50 on both rings 26 and 28. There is no requirement, however, that the POP node listen to both rings, and by the same token, some of the other nodes in network 46 may have receive ports on both of the rings.

Preferably, each of nodes 40 opens its receive port on the ring over which it has the shortest path (fewest hops) to communicate with POP node 48. Alternatively, other criteria may be used to choose the receive ports. Any suitable protocol may be used by the nodes to choose their receive ports and to inform the other nodes of the choice. Exemplary protocols are described hereinbelow with reference to FIGS. 5 and 6.

Figure 5:
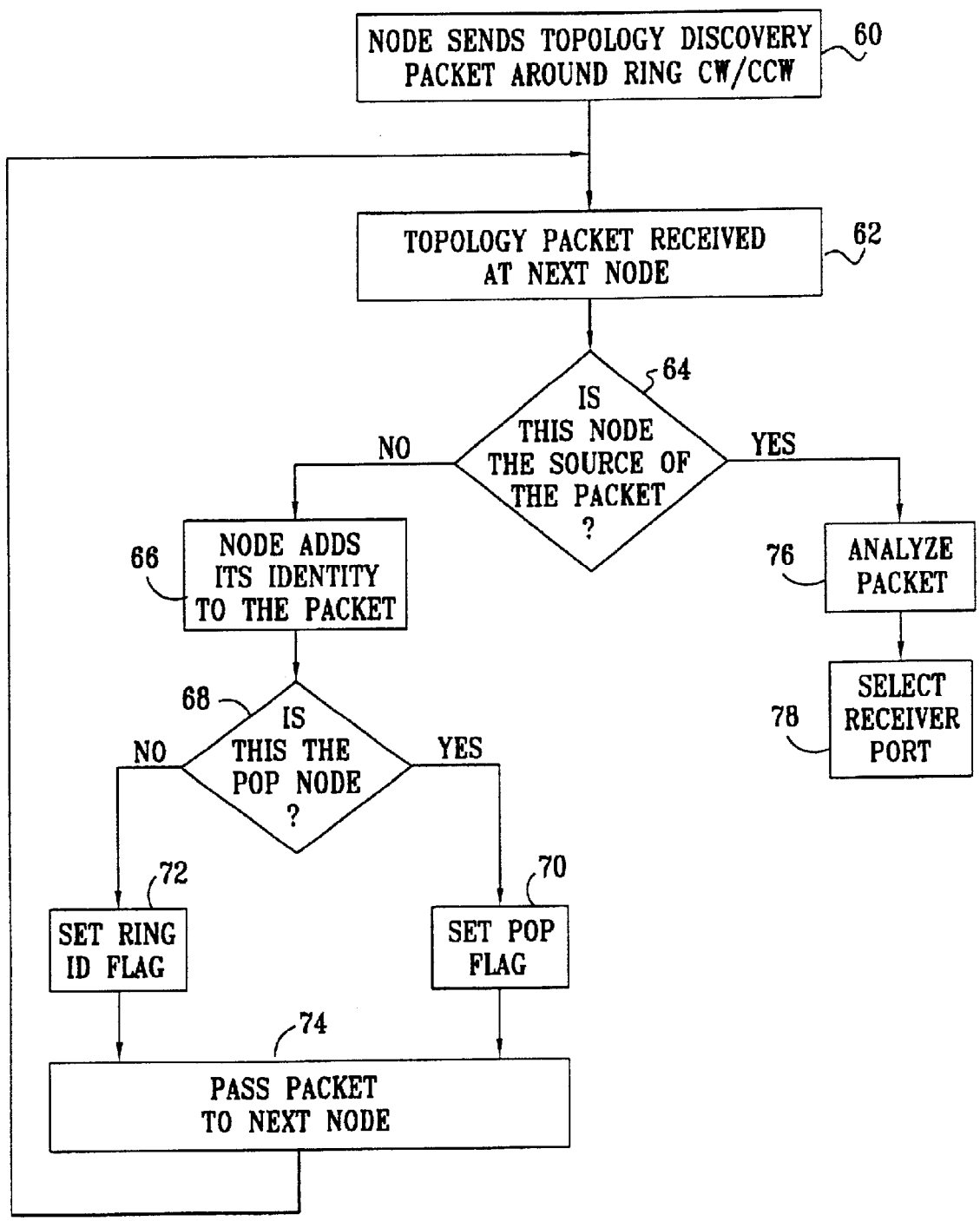
FIG. 5 is a flow chart that schematically illustrates a method for topology discovery, in accordance with a preferred embodiment of the present invention.

FIG. 5 is a flow chart that schematically illustrates a method used by node 40 to select its receive port 50, in accordance with a preferred embodiment of the present invention. This method draws on aspects of the topology discovery procedure described in the above-mentioned RFC 2892, but includes novel aspects that are specific to the present invention. To initiate the method, node 40 sends a topology discovery packet to the next node along one of rings 26 and 28, at a packet sending step 60. The node identifies itself in the packet as the packet source. Preferably, the node sends out these packets on both of the rings at start-up of network 46, and repeats the procedure from time to time while the network is running to identify changes in topology or in settings of the other nodes. The topology discovery packet is delivered from each node to the next around the ring, hop-by-hop, as a unicast packet.

Upon receiving a topology discovery packet, at a packet reception step 62, the receiving node first checks to determine whether it was the source of the packet, at a packet checking step 64. If not, the node adds its own identity information to an ordered list in the packet, in an identification step 66. Typically, this information includes the node's MAC address binding, as in the SRP topology discovery procedure. Other information is preferably added if the receiving node is POP node 48, at a POP determination step 68. In this case, the POP node sets a flag in its identity information indicating that it is the POP node, at a POP flag setting step 70. Optionally, if the receiving node is not the POP node, the receiving node sets another flag in its identity information, at a ring flag setting step 72, indicating the ring on which the node will have its receive port 50 for incoming traffic during normal network operation. After adding all of the required information to the packet, the node passes the packet on to the next node in the ring, at a packet delivery step 74. This process continues until the packet has looped around the entire ring and back to the source node.

When the node receiving the topology discovery packet determines, at step 64, that it was the source of the packet that it just received, the node captures and analyzes the packet to learn the identities and positions of the other nodes on the ring, at an analysis step 76. Based on his information, the node is able to determine the identity and location of POP node 48, and to select its receiver port 50 accordingly, at a selection step 78. Preferably, as noted above, the node chooses to open its receiver port on ring 26 or 28 depending on which ring gives the shortest path from POP node 48, measured in terms of hop count. Thus, in the example of FIG. 4, nodes N1 and N2 have their receiver ports on ring 26, while nodes N3 and N4 have their receiver ports on ring 28.

Alternatively, node 40 may use other criteria in analyzing the network topology and selecting its receiver port at step 78. For example, if there is no dominant node (such as POP node 48) in the network, each node may decide at random on which ring to open its receiver port. As long as all of the nodes load the network more or less equally, random selection of the receiver ports will generally yield approximately equal loading of rings 26 and 28 and of the individual segments on the rings. After making their random selections and starting up the network, the nodes in the network may use the topology discovery procedure of FIG. 5 to check on the number and distribution of receiver port selections by the other nodes. If one of the nodes determines that the ring it has selected for its receiver port is overpopulated (for example, with more than 60% of the nodes listening on the same ring), it can change its selection to the other ring. Preferably, to avoid rapid toggling between rings, each node is allowed to change its receiver port no more than once in a predetermined time interval. The interval is preferably set individually for each node, as a function of the node identifier, for example.

Node 40 also uses the information that it gleaned at step 76 to determine on which of rings 26 or 28 to send traffic to each of the other nodes in network 46. The sending node must send the traffic, of course, over the ring on which the receiving node has set its receiver port 50 to listen. One possible solution for this purpose was noted above in reference to step 72, whereby each of the nodes indicates in the topology discovery packet the ring to which it has chosen to listen. At analysis step 76, the source node builds a table, which is held by RPR block 42 and indicates the receiver port that is open for each of the other nodes. Then, when traffic processing block 44 passes a packet to RPR block 42 to be transmitted to a given node, the RPR block looks up the destination node in its table and thus decides whether to send the packet on ring 26 or ring 28.

As an alternative solution, the choice of ring can be encoded into the destination address itself of each of the nodes. For example, if network 46 operates over Ethernet media, each node 40 will have one Ethernet MAC address on ring 26 and a different Ethernet MAC address on ring 28. The nodes can be configured so that all of the MAC addresses on ring 26 are even numbers, while those on ring 28 are odd numbers (or vice versa). When RPR block 42 of one of the nodes receives a packet to deliver to another of the nodes, it simply checks the least significant bit of the destination node MAC address in order to choose the ring on which the packet is to be sent. Packets with broadcast or multicast MAC addresses are preferably distributed over both rings.

Figure 6:
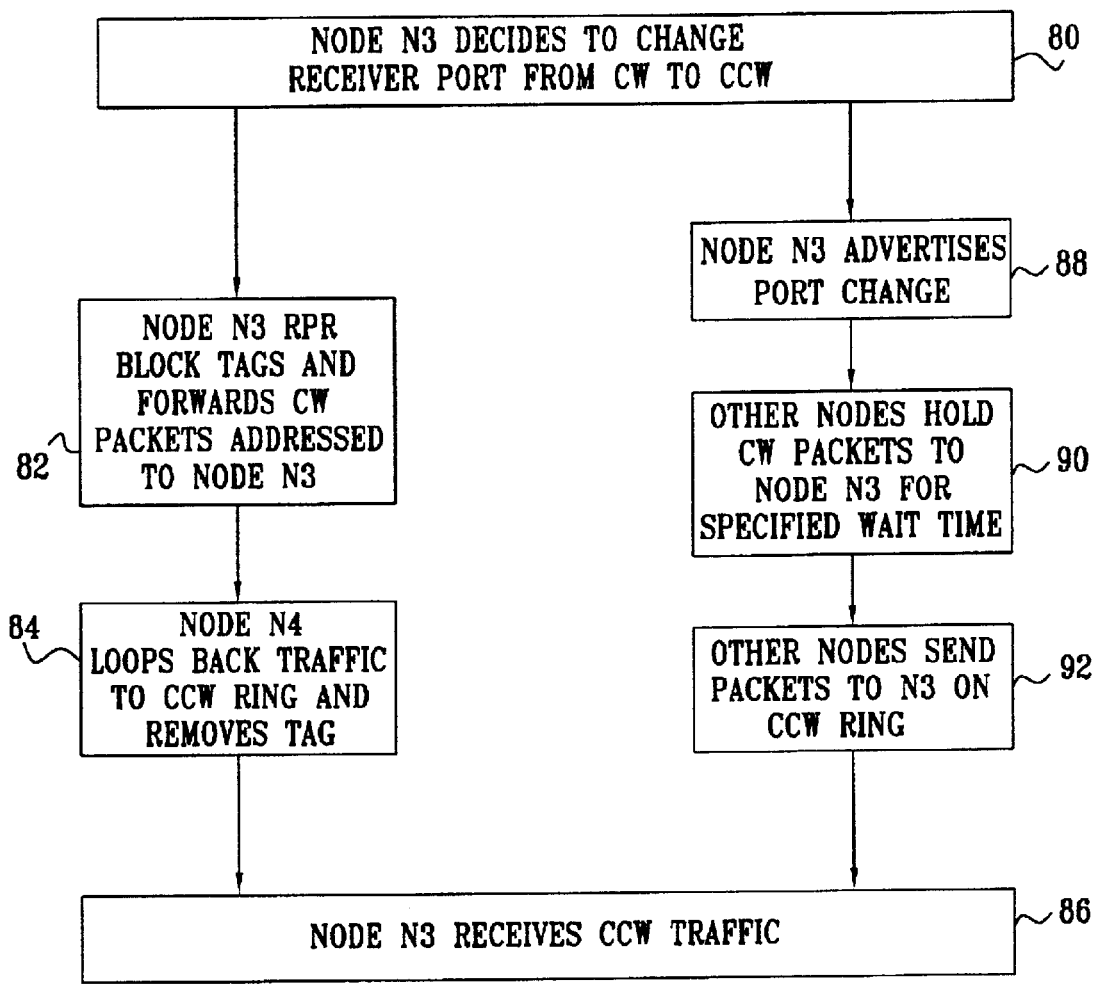
FIG. 6 is a block diagram that schematically illustrates a method for changing a receiver port of a node in a ring network, in accordance with a preferred embodiment of the present invention.

FIG. 6 is a flow chart that schematically illustrates a method by which one of nodes 40 changes its receiver port 50, in accordance with a preferred embodiment of the present invention. By way of example, we consider node N3 (FIG. 4), and assume that the node has decided to change its receiver port from ring 26 (clockwise—CW) to ring 28 (counterclockwise—CCW) at a decision step 80. The change typically comes in response to changes in network 46, such as addition or removal of a node or a break in one of the rings between two of the nodes, causing traffic to be wrapped back or steered onto the other ring. Alternatively, the change may be induced, as described above, when node N3 takes note that a disproportionate number of nodes 40 have their receiver ports on ring 26, or that ring 26 is carrying substantially more traffic than ring 28.

Immediately upon changing the receiver port from ring 26 to ring 28, RPR block 42 of node N3 stops passing incoming packets on ring 26 to traffic processing block 44. Instead, the RPR block tags these packets and forwards them along ring 26 to the next node on the ring, N4, at a tagging step 82. Node N4 reads the tag carried by the forwarded packets and, in response to the tag, loops the packets back to node N3 on ring 28, at a loop-back step 84. Node N4 preferably removes the tag before sending the packets back to node N3. When the looped-back packets arrive at node N3 on ring 28, RPR block 42 captures them and passes them to traffic processing block 44, at a packet reception step 86.

Meanwhile, node N3 must advertise to the other nodes in network 46 that it has changed its receive port, typically by sending an appropriate topology packet to the other nodes, at an advertising step 88. Upon receiving the topology packet, the RPR blocks of the other nodes update their address tables or mapping tables accordingly to indicate that all traffic to node N3 should now be sent over ring 28.

Preferably, however, the other nodes do not immediately begin sending such traffic, but rather delay transmission for a specified waiting period, at a delay step 90. The packets are meanwhile held by the other nodes in buffers that are prepared for this purpose. The reason for the delay is to allow the loop-back process of step 84 to be completed before the other nodes start sending new packets directly to node N3 on ring 28. Otherwise, the new packets may arrive at node N3 out of order, ahead of the earlier looped-back packets from node N4. When the waiting period is over, the other nodes begin sending the new packets to node N3 on ring 28, at a packet sending step 92. Node N3 then receives these packets, generally in the proper order, at step 86.

The duration of the waiting period at step 90 should take into account the time required for old packets forwarded by node N3 on ring 26 at step 82 to reach node N4 and to be looped back to N3. This time depends on the data rate of ring 26 and on the characteristics of the media and the buffers used at the nodes. These factors vary from network to network, and the optimal waiting period is therefore a function of the specific implementation in each network.

The selective delay required at step 90 may be difficult to implement in practice. Therefore, alternatively, this step is omitted, and the nodes instead proceed directly to sending step 92. Although some packets may arrive at node N3 out of order, many application-layer protocols are capable of handling a certain amount of misordering.

Although preferred embodiments are described herein with reference to certain specific types of networks and protocols, and particularly to packet networks based on the RPR protocol, the principles of the present invention are similarly applicable in bidirectional ring networks and protocols of other types. It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A communication network, comprising:
a communication medium; and
a plurality of communication nodes, mutually coupled by the communication medium so as to form a ring, over which each of the nodes is configured to transmit traffic to the other nodes in both clockwise and counterclockwise directions around the ring, while at least one of the nodes is configured to receive the traffic in only one of the directions at any given time,
wherein the nodes are adapted to maintain information indicative of the respective directions in which the other nodes are configured to receive the traffic, and to select the directions in which to transmit the traffic to the other nodes responsive to the information, and
wherein the nodes are adapted to send topology discovery packets around the ring to the other nodes in both the clockwise and the counterclockwise directions, and to extract the information from the packets after the packets have made a complete circuit of the ring.

2. A network according to claim 1, wherein the plurality of the nodes comprises a gateway node, and wherein the at least one of the nodes is configured to receive the traffic in the direction in which the at least one of the nodes is reached from the gateway nodes in a minimal number of hops.

3. A network according to claim 2, wherein the gateway node is configured to receive the traffic in both the clockwise and counterclockwise directions.

4. A network according to claim 2, wherein the at least one of the nodes comprises a network access node.

5. A network according to claim 1, wherein multiple nodes among the plurality of the communication nodes are each configured to receive the traffic only in a respective one of the directions at any given time, and wherein the respective direction is selected for each of the multiple nodes so as to balance the traffic carried in the clockwise and counterclockwise directions around the ring.

6. A network according to claim 1, wherein the at least one of the nodes is adapted to reconfigure the direction in which it is to receive the traffic while the network is in operation, and to send the remaining nodes in the network a notification when it reconfigures the direction, so that the remaining nodes update accordingly the information that they maintain.

7. A network according to claim 6, wherein upon receiving the notification, the remaining nodes delay transmitting the traffic to the at least one of the nodes for a predetermined waiting period.

8. A network according to claim 1, wherein the at least one of the nodes is adapted to reconfigure the direction in which it is to receive the traffic while the network is in operation.

9. A communication device, for operation as a node in a ring network over which traffic is transmitted in both clockwise and counterclockwise directions, the device comprising:
a traffic processing block, adapted to prepare outgoing data packets for transmission over the network and to process incoming data packets received from the network; and
a media access control block, interfacing to the traffic processing block and adapted to be coupled to the network so as to transmit the outgoing data packets over the network in both of the clockwise and counterclockwise directions, while passing to the traffic processing block the incoming data packets that it receives in only one of the clockwise and counterclockwise directions
wherein the media access control block is adapted to maintain information indicating in which of the directions other nodes in the network are configured to receive the traffic, and to select the directions in which to transmit the outgoing data packets to the other nodes responsive to the information, and
wherein the media access control block is adapted to send topology discovery packets around the ring to the other nodes in both the clockwise and the counterclockwise directions, and to extract the information from the packets after the packets have made a complete circuit of the ring.

10. A device according to claim 9, wherein the network is configured to carry the traffic at a predetermined maximum data rate in each of the clockwise and counterclockwise directions, and wherein the media access control block and traffic processing blocks are interfaced to one another at a data rate riot substantially greater than the predetermined maximum.

11. A device according to claim 9, wherein the media access control block is configurable to enable selection, while the network is in operation, of the one of the clockwise and counterclockwise directions in which the incoming data packets are to be received and passed to the traffic processing block.

12. A method for communication, comprising:
coupling a plurality of communication nodes together in a ring, so as to enable each of the nodes to transmit traffic simultaneously in both clockwise and counterclockwise directions;
configuring at least one of the nodes to receive the traffic in only one of the directions at any given time;
maintaining information at the nodes indicative of the respective directions in which the other nodes are configured to receive the traffic; and
transmitting the traffic to the other nodes responsive to the information,
wherein maintaining the information comprises sending topology discovery packets around the ring to the nodes in both the clockwise and the counterclockwise directions in order to gather the information, and extracting the information from the packets after the packets have made a complete circuit of the ring.

13. A method according to claim 12, wherein coupling the plurality of the nodes comprises a coupling a gateway node among the nodes in the ring, and wherein configuring the at least one of the nodes comprises configuring the node to receive the traffic in the direction in which the at least one of the nodes is reached from the gateway nodes in a minimal number of hops around the ring.

14. A method according to claim 13, wherein coupling the gateway node comprises configuring the gateway node to receive the traffic in both the clockwise and counterclockwise directions.

15. A method for communication, comprising:
coupling a plurality of communication nodes together in a ring, so as to enable each of the nodes to transmit traffic simultaneously in both clockwise and counterclockwise directions; and
configuring at least one of the nodes to receive the traffic in only one of the directions at any given time,
wherein configuring the at least one of the nodes comprises configuring each of a multiplicity of the nodes in the ring to receive the traffic only in a respective one of the directions, and selecting the respective direction for each of the multiplicity of the nodes so as to balance the traffic carried in the clockwise and counterclockwise directions around the ring.

16. A method according to claim 12, wherein configuring the at least one of the nodes comprises reconfiguring the direction in which the node is to receive the traffic while the network is in operation, and sending the remaining nodes in the network a notification that the direction has been reconfigured, whereby the information is updated accordingly.

17. A method according to claim 16, wherein transmitting the traffic comprises, upon receiving the notification, delaying transmission of the traffic front the remaining nodes to the at least one of the nodes for a predetermined waiting period.

18. A method according to claim 12, wherein configuring the at least one of the nodes comprises reconfiguring the direction while the network is in operation.

19. A method according to claim 12, wherein coupling the plurality of the communication nodes comprises setting up the network to carry the traffic at a predetermined maximum data rate in each of the clockwise and counterclockwise directions, and wherein configuring the at least one of the nodes comprises configuring the at least one of the nodes to receive the traffic at a data rate not substantially greater than the predetermined maximum.

* * * * *

UNITED STATES PATENT AND TRADEMARK OFFICE
CERTIFICATE OF CORRECTION

PATENT NO. : 6,952,397 B2  Page 1 of 1
APPLICATION NO. : 09/876414
DATED : October 4, 2005
INVENTOR(S) : Gal Mor et al.

It is certified that error appears in the above-identified patent and that said Letters Patent is hereby corrected as shown below:

Column 9, claim 10, line 55, "riot" should read --not--; and

Column 10, claim 17, line 52, "front" should read --from--.

Signed and Sealed this

Twenty-sixth Day of September, 2006

JON W. DUDAS
*Director of the United States Patent and Trademark Office*